(12) United States Patent
Caramma

(10) Patent No.: US 10,375,131 B2
(45) Date of Patent: Aug. 6, 2019

(54) SELECTIVELY TRANSFORMING AUDIO STREAMS BASED ON AUDIO ENERGY ESTIMATE

(71) Applicant: Cisco Technology, Inc., San Jose, CA (US)

(72) Inventor: Marcello Caramma, Binfield (GB)

(73) Assignee: Cisco Technology, Inc., San Jose, CA (US)

( * ) Notice: Subject to any disclaimer, the term of this patent is extended or adjusted under 35 U.S.C. 154(b) by 130 days.

(21) Appl. No.: 15/599,677

(22) Filed: May 19, 2017

(65) Prior Publication Data
US 2018/0337964 A1   Nov. 22, 2018

(51) Int. Cl.
| | |
|---|---|
| *G06F 15/16* | (2006.01) |
| *H04L 29/06* | (2006.01) |
| *H04W 88/02* | (2009.01) |
| *G10L 19/16* | (2013.01) |
| *H04N 21/439* | (2011.01) |
| *G10L 19/012* | (2013.01) |
| *G10L 19/02* | (2013.01) |

(52) U.S. Cl.
CPC .......... *H04L 65/403* (2013.01); *G10L 19/167* (2013.01); *H04L 65/605* (2013.01); *H04W 88/02* (2013.01); *G10L 19/012* (2013.01); *G10L 19/0212* (2013.01); *H04N 21/4394* (2013.01)

(58) Field of Classification Search
CPC ... G10L 25/21; H04M 3/568; G10H 2250/235
See application file for complete search history.

(56) References Cited

U.S. PATENT DOCUMENTS

| | | | | |
|---|---|---|---|---|
| 5,327,367 A | * | 7/1994 | Yamada | G06F 17/142 708/404 |
| 6,748,019 B1 | * | 6/2004 | Lin | H04N 19/176 375/240.24 |
| 7,839,803 B1 | * | 11/2010 | Snelgrove | H04M 3/56 370/235 |
| 8,239,050 B2 | | 8/2012 | Crockett et al. | |
| 8,731,216 B1 | | 5/2014 | Chari et al. | |

(Continued)

FOREIGN PATENT DOCUMENTS

EP   2002426 B1   9/2009

OTHER PUBLICATIONS

M. Schnell, et al., "Delayless mixing—on the benefits of MPEG-4 AAC-ELD in high quality communication systems", 124th AES Convention, Amsterdam, The Netherlands (vol. 7337), May 2008, 10 pages.

(Continued)

*Primary Examiner* — Hieu T Hoang
(74) *Attorney, Agent, or Firm* — Edell, Shapiro & Finnan, LLC

(57) ABSTRACT

A server receives, from each of a plurality of participant devices in a communication session, a respective one of a plurality of audio streams. The server estimates an audio energy of each of the plurality of audio streams and determines whether to perform a transform on at least one of the plurality of audio streams. If so, the server performs the transform on the at least one of the plurality of audio streams and transmits the at least one of the plurality of audio streams to at least one of the plurality of participant devices.

20 Claims, 4 Drawing Sheets

(56) References Cited

U.S. PATENT DOCUMENTS

| | | | |
|---|---|---|---|
| 9,208,796 B2 | 12/2015 | Thepie Fapi et al. | |
| 9,626,986 B2* | 4/2017 | Sehlstedt | G10L 25/21 |
| 9,865,274 B1* | 1/2018 | Vicinus | G10L 19/20 |
| 10,063,394 B2* | 8/2018 | Lopez | H04L 25/0204 |
| 2003/0185300 A1* | 10/2003 | Hagiwara | H04N 19/162 375/240.03 |
| 2004/0228535 A1* | 11/2004 | Honda | H04N 19/30 382/233 |
| 2008/0190269 A1 | 8/2008 | Eom et al. | |
| 2008/0288262 A1* | 11/2008 | Makiuchi | G10L 19/24 704/500 |
| 2009/0094026 A1 | 4/2009 | Cao et al. | |
| 2009/0240491 A1* | 9/2009 | Reznik | G10L 19/24 704/219 |
| 2009/0304190 A1* | 12/2009 | Seefeldt | G10L 25/69 381/56 |
| 2013/0317813 A1 | 11/2013 | Gao | |
| 2014/0039890 A1* | 2/2014 | Mundt | G10L 19/167 704/236 |
| 2014/0369528 A1* | 12/2014 | Ellner | H04M 3/568 381/119 |
| 2015/0127356 A1* | 5/2015 | Chen | G10L 19/02 704/500 |
| 2016/0019902 A1 | 1/2016 | Lamblin et al. | |
| 2018/0012616 A1* | 1/2018 | Salishev | G10L 21/0216 |

OTHER PUBLICATIONS

E. Ivov, Ed., et al., "A Real-time Transport Protocol (RTP) Header Extension for Mixer-to-Client Audio Level Indication" Internet Engineering Task Force (IETF), ISSN: 2070-1721, RFC 6465, Dec. 2011, 15 pages.

\* cited by examiner

US 10,375,131 B2

SELECTIVELY TRANSFORMING AUDIO STREAMS BASED ON AUDIO ENERGY ESTIMATE

TECHNICAL FIELD

The present disclosure relates to estimating the audio energy of audio streams in order to selectively transform one or more audio streams.

BACKGROUND

Multimedia conferences generally involve a number of participant devices (e.g., laptops, phones, etc.) which encode audio signals and transmit the encoded audio signal to a server. Some of these encoded audio signals may include participant speech, but often these signals simply include background noise. The server fully decodes and/or encodes each audio stream, including the audio streams of background noise. Based on the audio energies of the fully decoded and/or encoded audio streams, the server determines which participants are currently speaking and mixes only the strongest/highest energy audio stream(s) into a mixed audio signal. The server then sends the mixed audio signal to the participant devices.

DESCRIPTION OF EXAMPLE EMBODIMENTS

Overview

In accordance with one embodiment, a server receives, from each of a plurality of participant devices in a communication session, a respective one of a plurality of audio streams. The server estimates an audio energy of each of the plurality of audio streams and, based on the estimated audio energy of each of the plurality of audio streams, determines whether to perform a transform on at least one of the plurality of audio streams. If it is determined to perform the transform on the at least one of the plurality of audio streams, the server performs the transform on the at least one of the plurality of audio streams and transmits the at least one of the plurality of audio streams to at least one of the plurality of participant devices.

Example Embodiments

For audio-only or multimedia conferences involving a large number of participants, it can be overly burdensome for a conference server to fully decode the modified discrete cosine transform (MDCT) audio stream of every participant device. Fully decoding an MDCT audio stream requires performing an inverse MDCT, which is a computationally intensive process. As a result, conventional servers often perform inverse MDCTs on a large number of audio streams even though the server will only mix a fraction of those inverse-MDCT audio streams into the final (mixed) audio stream to send to the participant devices.

A Real-time Transfer Protocol (RTP) header extension may include the audio energy of a packet, thereby facilitating the selective full decoding of only certain audio streams. However, many streams do not include, and a significant amount of equipment cannot implement, such RTP header extensions. As such, provided herein are techniques for the flexible, scalable, and selective decoding of audio streams. These techniques reduce the computational burden on servers facilitating large multimedia conferences and are compatible with non-RTP streams and non-RTP capable equipment.

Figure 1:
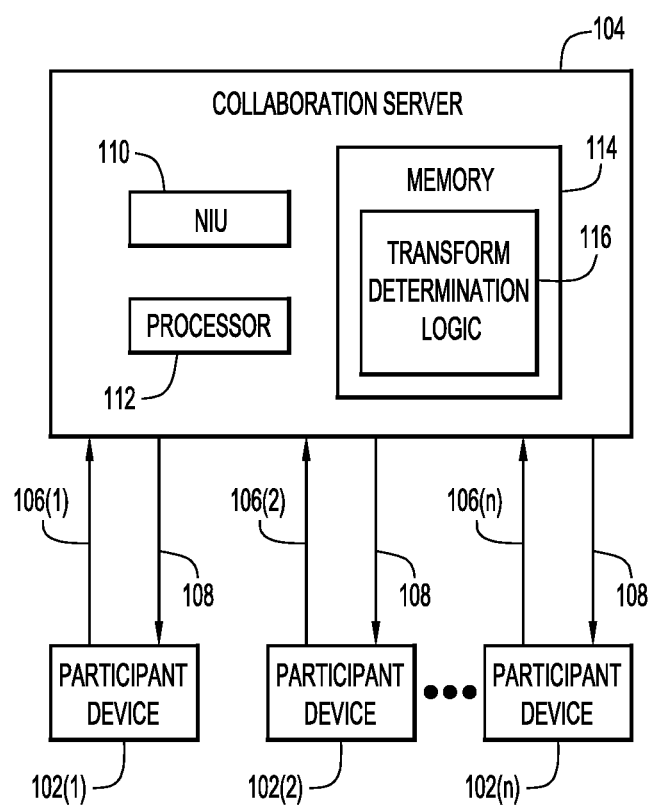
FIG. 1 is a block diagram illustrating a collaboration server configured to analyze audio streams in a large multimedia conference, according to an example embodiment.

With reference made to FIG. 1, a system 100 is shown that includes a plurality of participant devices 102(1)-(n) participating in a large multimedia conference via a collaboration server 104. Each of the participant devices 102(1)-(n) respectively transmits audio streams 106(1)-(n) to the collaboration server 104. The collaboration server 104 transmits an audio stream 108 to the participant devices 102(1)-(n). The collaboration server 104 includes a network interface unit (NIU) 110, processor 112 (or multiple processors), and a memory 114 that stores executable instructions for transform determination logic 116.

In one example, initially, participant devices 102(1)-(n) detect local audio signals. For example, participant devices 102(1) may be a laptop or phone configured to detect a user voice. Rather than transmitting these audio streams directly to the collaboration server 104 in the time domain, participant devices 102(1)-(n) first perform a MDCT on the audio signals to produce MDCT frequency domain audio streams 106(1)-(n). The MDCT process converts a time domain signal to a frequency domain signal, thereby enabling compression of audio signals. Performing a MDCT on an audio signal yields MDCT frequency coefficients, each of which may correspond to one or more subbands of the audio signal.

After performing the MDCT, the participant devices 102(1)-(n) may initiate a perceptual analysis of the respective MDCT frequency domain audio streams 106(1)-(n). Based on the perceptual analysis, the participant devices 102(1)-(n) may perform quantization (i.e., the removal of perceptual redundancy), followed by entropy coding (i.e., the removal of statistical redundancy) on the respective MDCT frequency domain audio streams 106(1)-(n). The participant devices 102(1)-(n) may then perform multiplexing for the respective MDCT frequency domain audio streams 106(1)-(n).

The collaboration server 104 receives audio streams 106(1)-(n). As described in greater detail below, the collaboration server 104 partially decodes audio streams 106(1)-(n) so as to determine MDCT frequency coefficients corresponding to the audio streams 106(1)-(n). Based on these MDCT frequency coefficients, the collaboration server 104 estimates the audio energy of each of the audio streams 106(1)-(n). This takes advantage of Parseval's theorem, which loosely states that the energy of a signal represented in the frequency domain signal is equal to the energy of that signal represented in the time domain, while ignoring any issues relating to the overlapping of the audio frames. Thus, based on the estimated audio energy of the audio streams 106(1)-(n), the collaboration server 104 determines whether at least one of the audio streams 106(1)-(n) is to be transformed to the time domain.

In an example, the estimated audio energy of audio stream 106(2) is great enough to cause the collaboration server 104 to determine that audio stream 106(2) is to be transformed to the time domain. As such, the collaboration server 104 performs an inverse MDCT (IMDCT) on the MDCT frequency domain audio stream 106(2) to reproduce the local audio signal at participant device 102(2) in the time domain. In this example, the estimated audio energy of audio stream 106(1) is not great enough to cause the collaboration server 104 to determine that audio stream 106(1) is to be transformed to the time domain. Thus, the collaboration server 104 transmits to the participant devices 102(1)-(n) audio stream 108, which includes the audio stream for participant device 102(2) but not the audio stream 106(1) for participant device 102(1).

In another example, the collaboration server 104 determines that both audio streams 106(1) and 106(2) are to be transformed to the time domain. In this example, the collaboration server 104 performs an IMDCT on both MDCT frequency domain audio streams 106(1) and 106(2), mixes the audio streams for participant devices 102(1) and 102(2), and transmits to the participant devices 102(1)-(n) audio stream 108. In this example, audio stream 108 includes the mixed audio streams for participant devices 102(1) and 102(2). If the collaboration server 104 encodes/compresses audio streams 108, the participant devices 102(1)-(n) decode/decompress respective audio streams 108 before outputting the audio for the users of the participant devices 102(1)-(n). The collaboration server 104 may thus act as a codec and/or mixer for participant devices 102(1)-(n) in a large multimedia conference. These techniques are compatible with several types/standards of codecs (e.g., advanced audio coding, constrained energy lapped transform in Opus, etc.).

As mentioned, the collaboration server 104 includes a NIU 110, one or more processors 112, and a memory 114, which includes instructions for transform determination logic 116. The NIU 110 is configured to enable network communications on behalf of the collaboration server to communicate with participant devices 102(1)-(n). The one or more processors 112 are configured to execute instructions stored in the memory 114 (e.g., instructions for transform determination logic 116). When executed by the one or more processors 112, the transform determination logic 116 enables the collaboration server 104 to perform operations described herein. The memory 114 may include read only memory (ROM), random access memory (RAM), magnetic disk storage media devices, optical storage media devices, flash memory devices, electrical, optical, or other physical/tangible memory storage devices. Thus, in general, the memory 114 may comprise one or more tangible (non-transitory) computer readable storage media (e.g., a memory device) encoded with software comprising computer executable instructions and when the software is executed (by the processor 112) it is operable to perform the operations described herein.

Generally, the collaboration server 104 fully decodes one or more of the audio streams 106(1)-(n) after partially decoding all audio streams 106(1)-(n) to obtain respective MDCT frequency coefficients. The MDCT frequency coefficients provide an estimate of the audio energy of the audio streams 106(1)-(n). In contrast to conventional collaboration servers, the collaboration server 104 avoids performing the computationally intensive IMDCT on every audio stream 106(1)-(n), thereby minimizing processing time. It will be appreciated that these techniques may be implemented in any conference or communication session that includes audio (e.g., an audio-only conference).

Figure 2:
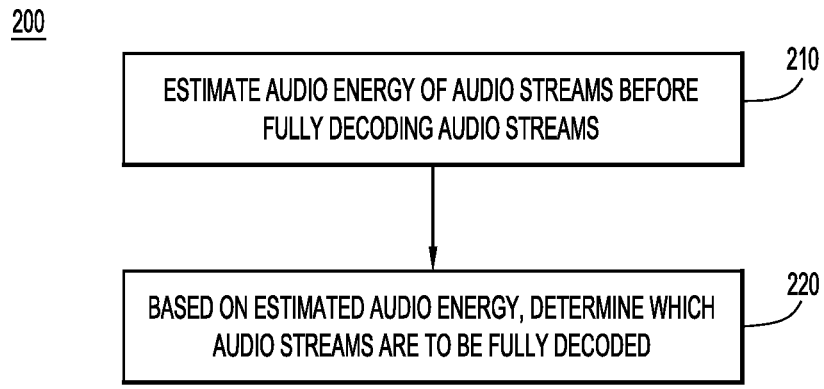
FIG. 2 is a high-level flowchart of a method for selectively transforming audio streams based on estimated audio energies for the audio streams, according to an example embodiment.

With reference to FIG. 2, shown is a high-level flow chart of a method 200 for selectively fully decoding audio streams based on estimated audio energies for the audio streams in accordance with examples presented herein. At 210, a collaboration server (e.g., collaboration server 104) estimates the audio energy of a plurality of audio streams (e.g., audio streams 106(1)-(n)). The collaboration server performs 210 before fully decoding one or more audio streams. At 220, based on the estimated audio energy, the collaboration server determines which audio streams are to be fully decoded.

Figure 3:
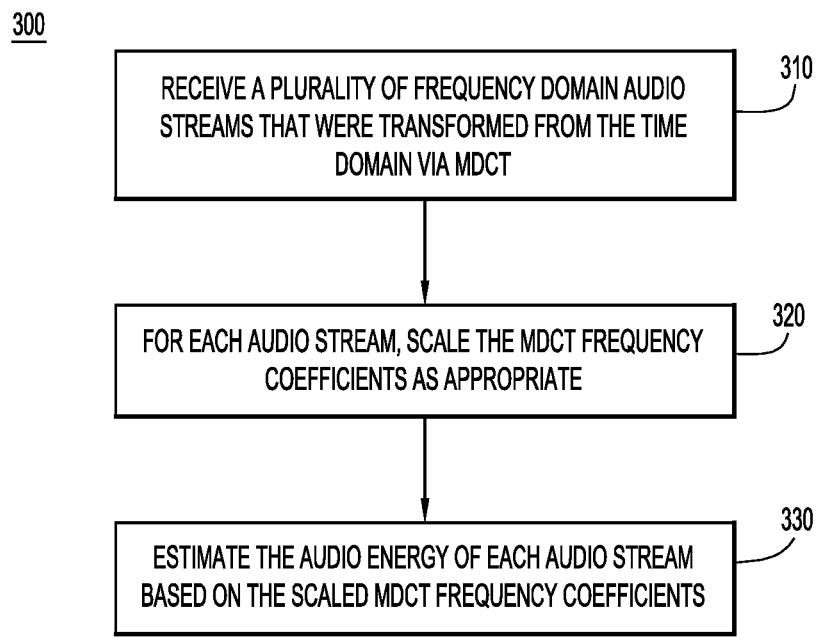
FIG. 3 is a flowchart of a method for estimating the respective audio energies of audio streams, according to an example embodiment.
Figure 4A:
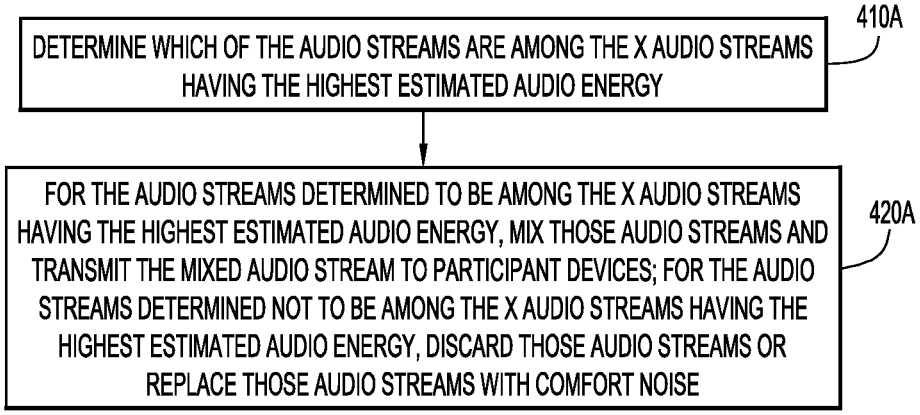
FIGS. 4A-4B are flowcharts of alternative methods for determining which audio streams are to be transformed, according to an example embodiment.
Figure 4B:
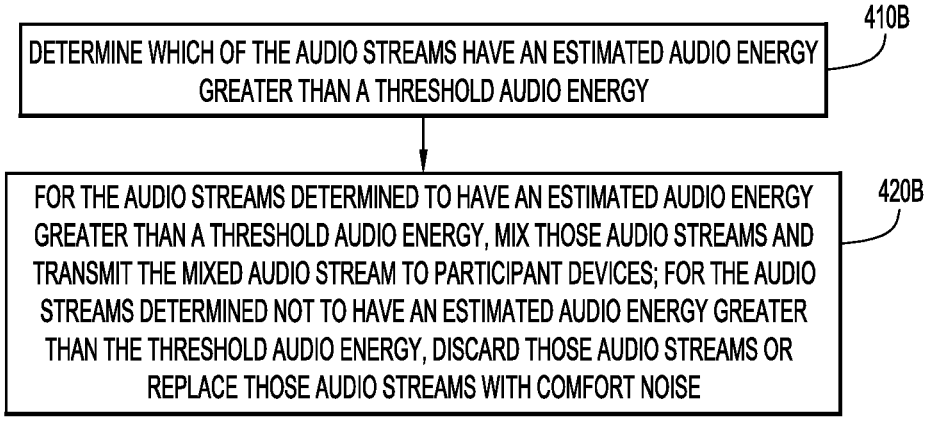

FIG. 3 is a flowchart of an example method for performing operation 210. FIGS. 4A-4B are flowcharts of alternative example methods for performing operation 220.

With reference made to FIG. 3, shown is an example method 300 for estimating the respective audio energies of audio streams, corresponding to operation 210 shown in FIG. 2. At 310, a collaboration server receives a plurality of MDCT frequency domain audio streams (e.g., audio streams 106(1)-(n)). At 320, the collaboration server scales the MDCT frequency coefficients as appropriate (e.g., via one or more filters). At 330, the collaboration server estimates the audio energy of each audio stream based on the scaled MDCT frequency coefficients. The collaboration server may estimate the audio energy of each audio stream by summing the square of the MDCT frequency coefficients for each stream. Example pseudocode for the method of FIG. 3 is provided as follows.

```
function ExtractPower(stream):
    Partially decode the bitstream up to the transform domain
    Scale the MDCT frequency coefficients mdct[i] appropriately
    calculate pow = sum(mdct[i]^2) for each i
    return pow
```

An example of decoding the bitstream up to the transform domain is provided as follows. Generally, this example corresponds to the inverse of the actions discussed in paragraph [0014] above. Initially, the bitstream to be partially decoded has a well-specified syntax. After parsing the bitstream, a collaboration server locates a portion of the bitstream containing the information required to decode the MDCT coefficients. The collaboration server performs an inverse entropy coding on the portion of the bitstream. Inverse entropy coding will provide a quantized value and an inverse quantization function (this usually includes a global scaling factor as well as a per-coefficient scaling factor, which would have been generated during the perceptual analysis). The collaboration server scales the coefficients because different coefficients were quantized with relatively broad or coarse quantization steps depending on the perceptual analysis of a given frequency for a given time frame.

As illustrated in FIGS. 4A-4B, once the audio energy/power is available, a collaboration server may conditionally execute a full decode/IMDCT of at least one of the audio streams. Turning first to FIG. 4A, shown is an example method 400A for determining which audio streams are to be fully decoded, corresponding to one example of operation 220 shown in FIG. 2. At 410A, the collaboration server determines which of the audio streams are among the X (e.g., four, etc.) audio streams having the highest estimated audio energy. At 420A, for the audio determined to be among the X audio streams having the highest estimated audio energy, the collaboration server mixes those audio streams and transmits the mixed audio stream to participant devices. If the collaboration server selects only the single highest-energy audio stream (i.e., if X equals one), the collaboration server may transmit the highest-energy audio stream to the participant devices without first mixing the stream. For the audio streams determined not to be among the X audio streams having the highest estimated audio energy, the collaboration server may discard those audio streams or replace those audio streams with comfort noise. Example pseudocode for the method of FIG. 4A is provided as follows.

```
function ProcessAudioStreams(streams[ ], audio_out[ ]):
    For s in streams:
        pow[s] = ExtractPower(s)
    LoudestStreams = ChooseLoudestStreams(pow[ ])
    For ls in LoudestStreams:
        raw_audio[ls] = CompleteStreamDecode(streams[ls])
    For os in audio_out:
        audio_out[os] = silence
        For ls in LoudestStream:
            if (ls is not the same as os):
                audio_out[s] = mix(out_audio[s],
                    raw_audio[ls])
```

The example pseudocode for the method of FIG. 4A splits the processing of the audio signals into a low-cost/computationally undemanding portion (ExtractPower) and a high-cost/computationally taxing portion (Complete Stream Decode). The collaboration server applies the ExtractPower function to every received audio stream, but only applies the CompleteStreamDecode (which includes performing the IMDCT) to a select number of audio streams. This allows multimedia or audio-only conferences to scale to very large numbers of participants with little extra cost.

FIG. 4B illustrates an alternative method 400B for determining which audio streams are to be fully decoded. At 410B, the collaboration server determines which of the audio streams have an estimated audio energy that is greater than a threshold audio energy. At 420B, for the audio streams determined to have an estimated audio energy greater than a threshold audio energy, the collaboration server mixes those audio streams and transmits the mixed audio stream to participant devices. If only a single audio stream has an audio energy greater than the threshold audio energy, the collaboration server may transmit the highest-energy audio stream to the participant devices without first mixing the stream. For the audio streams determined not to have an estimated audio energy greater than a threshold audio energy, the collaboration server may discard those audio streams or replace those audio streams with comfort noise. Example pseudocode for the method of FIG. 4B is provided as follows.

```
function Decode(stream):
    pow = ExtractPower(stream)
    if pow > threshold:
        audio_out = ContinueDecoding(stream)
    else:
        audio_out = ComfortNoiseGeneration( )
    return audio_out
```

The collaboration server may calculate a value for the threshold audio energy based on an estimated noise floor. The ComfortNoiseGeneration function permits the collaboration server to replace the audio streams determined not to have an estimated audio energy greater than the threshold audio energy with a comfort noise frame. In an example, the comfort noise frame corresponds to an all-zero frame.

In another example, the collaboration server performs a full decode if audio streams have an estimated audio energy that is greater than a threshold audio energy (as discussed in relation to FIG. 4B), or if the audio streams would require a processing load that is less than a processing load threshold to perform an IMDCT (e.g., where the threshold audio energy is a function of the processing load). For example, the collaboration server performs a full decode if the collaboration server has enough spare cycles to perform the full decode (as in this case there is no reason to degrade the quality) or if the participant must be heard. In other words, when a minimal number of processing cycles are available, the collaboration server may avoid decoding packets for which the power is below a certain threshold, and instead generate comfort noise for those packets. Example pseudocode is provided as follows.

```
function Decode(stream):
    pow = ExtractPower(stream)
    if ((pow > threshold) || (OverallCPULoad < LoadThreshold)):
        audio_out = ContinueDecoding(stream)
    else:
        audio_out = ComfortNoiseGeneration( )
    return audio_out
```

Here, ComfortNoiseGeneration function allows the collaboration server to gracefully degrade the quality of a received audio stream. The collaboration server thus selectively avoids fully decoding those frames that are less likely to be relevant (i.e., the frames without speech) in cases involving potential central processing unit (CPU) overload.

In the example described above, the transform determination logic 116 (FIG. 1) selectively decodes the audio streams to minimize undue computational burden. As described below, alternatively the transform determination logic 116 may selectively encode audio streams before transmitting the audio streams to the participant devices.

Turning back to FIG. 1, during the multimedia conference, the collaboration server 104 generates MDCT audio streams 108 to be delivered to each participant device 102(1)-(n). Instead of automatically transmitting an MDCT audio stream 108, the collaboration server instead analyzes audio samples in the time domain from audio streams 106(1)-(n) using the transform determination logic 116. If the analysis indicates that certain audio streams should be transmitted to the participant devices 102(1)-(n), the collaboration server 104 performs a MDCT on those audio streams and transmits the MDCT audio stream 108(1) to the participant devices 102(1)-(n). If the analysis indicates that certain audio streams should not be transmitted to the participant for that time frame, the collaboration server 104 does not perform a MDCT on those audio streams for that time frame and may transmit a "fake" MDCT frame in the audio stream (e.g., an MDCT audio frame with all zero MDCT coefficient values).

As mentioned, the collaboration server 104 may perform an analysis by estimating the power of the audio signal in the time domain (i.e., before performing the MDCT). The collaboration server 104 may further determine whether to perform a MDCT on certain audio streams based on the estimated audio energy (e.g., if the estimated audio energy is greater than a threshold, the collaboration server 104 performs an MDCT on the audio signal to be delivered to participant devices 102(1)-(n)). In this example, if certain audio streams are silent for a period of time (e.g., because all other participants of the conference are silent) the collaboration server 104 may determine that a MDCT should not be performed on those audio streams. However, if an audio stream to be delivered to participant devices 102(1)-(n) is relatively high energy (e.g., a participant in the conference speaks), the transform determination logic 116 may determine that a MDCT should be performed on that audio stream.

If the estimated audio energy of an audio stream falls below a threshold, the audio stream may be considered background noise. As mentioned, in this case the collaboration server 104 may generate a comfort noise packet directly in the MDCT domain (possibly subject to a CPU load). In an example, the collaboration server 104 sets all MDCT coefficients to zero without executing the computationally intensive MDCT transform, and sets all quantization steps to a default value without any computationally intensive perceptual analysis. The collaboration server 104 then passes the (zero-value) MDCT coefficients to the entropy coder. This allows the collaboration server 104 to bypass the MDCT and perceptual analysis for the audio stream to be delivered to that participant, drastically saving processing costs (e.g., processing time). In an example, the selective encoding (or decoding) may occur on one or more participant device 102(1)-(n) in addition to/instead of the collaboration server 104.

If the collaboration server transforms multiple audio streams, the collaboration server 610 may mix those audio streams together before transmitting those audio stream to the participant devices 102(1)-(n). In an alternative example, the collaboration server 104 may decline to transmit any audio streams whose estimated audio energy fall below an audio threshold. However, not sending these packets may confuse certain receivers that expect packets at regular intervals.

Comfort noise generation may also be accomplished by estimating the statistical properties of the comfort noise in each subband, and generating the MDCT coefficients based on those properties. For example the collaboration server 104 may, for a subset of the packets below thresholds (i.e., packets designated for comfort noise), estimate the root-means-squared value of the comfort noise for each of the subbands. The estimate may be used to generate "fake" MDCT coefficients with the same spectral characteristics. If explicitly supported, this may be used with a comfort noise payload. However, this is also enabled for cases in which comfort noise payloads and/or discontinuous transmission capabilities are not supported. Example pseudocode is provided as follows.

```
Encode (audio frame):
    Energy = calc_energy(audio frame)
    If (energy > threshold)
        Continue_Encode(audio frame)
    Else
        If (comfort_noise_count == 0)
            EstimateComfortNoise(audio frame)
            Comfort_noise_count = 100 // e.g. update comfort
                noise every 100 low energy frames
            GenerateComfortNoise( )
        Comfort_noise_count = Comfort_noise_count - 1
Where
EstimateComfortNoise(audio frame):
    mdct = MDCT(audio frame)
    if (first_noise_frame):
        cn[i] = abs(mdct[i]) for each i // Initialize the comfort
            noise estimate
    else:
        update cn[i] = sqrt(alpha * cn[i] * cn[i] + (1- alpha)
            mdct[i]*mdct[i]) for each i // updates the comfort noise
            estimate
    first_noise_frame = false
and
GenerateComfortNoise( ):
    Mdct[i] = cn[i] * randn( ) for each i
    EncodeComfortNoiseFromMDCTCoeff(Mdct) // may include
        default quantization actions to quantize the MDCT coefficients
        before performing entropy coding and bitstream formatting.
```

Figure 5:
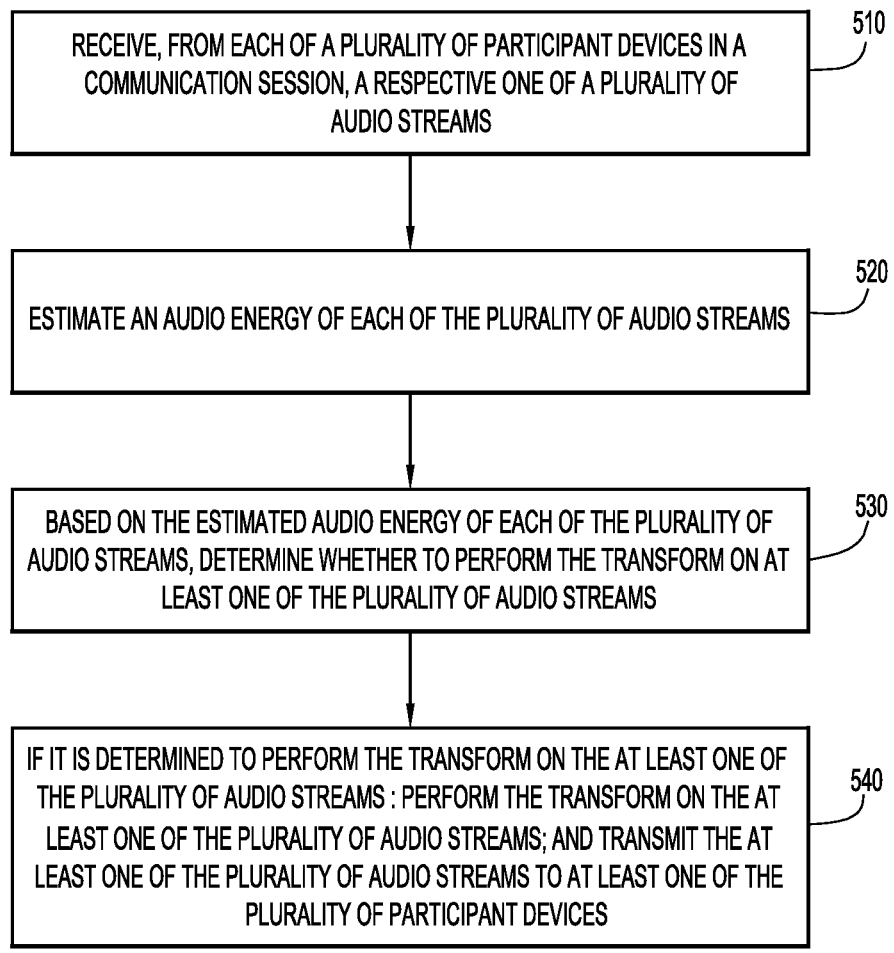
FIG. 5 is a flowchart of a generalized method in accordance with examples presented herein.

FIG. 5 is a flowchart of a generalized method 500 in accordance with examples presented herein. At 510, a server receives, from each of a plurality of participant devices in a communication session, a respective one of a plurality of audio streams. In a first example, the audio streams are modified discrete cosine transformed frequency domain audio streams, and the server partially decodes the plurality of audio streams so as to determine modified discrete cosine transform frequency coefficients corresponding to each of the plurality of audio streams. At 520, the server estimates an audio energy of each of the plurality of audio streams. In the first example, the server estimates the audio energy of each of the plurality of audio streams based on the modified discrete cosine transform frequency coefficients. In a second example, the server estimates the audio energy of each of the plurality of audio streams in the time domain. At 530, based on the estimated audio energy of each of the plurality of audio streams, the server determines whether to perform the transform on at least one of the plurality of audio streams. In the first example, the server determines whether to perform an inverse modified discrete cosine transform on the at least one of the plurality of audio streams. In the second example, the server determines whether to perform a modified discrete cosine transform on the at least one of the plurality of audio streams. At 540, if it is determined to perform the transform on the at least one of the plurality of audio streams, the server: performs the transform on the at least one of the plurality of audio streams; and transmits the at least one of the plurality of audio streams to at least one of the plurality of participant devices. In the first example, the server performs the inverse modified discrete cosine transform on the at least one of the plurality of audio streams. In the second example, the server performs/executes the modified discrete cosine transform on the at least one of the plurality of audio streams.

One of ordinary skill will appreciate that estimating the audio energy of audio streams in order to selectively decode one or more audio streams is not necessarily limited to transform-based codecs. In an example, a G.711 codec may decode a fraction of samples (e.g., one sample in ten), estimate the power based on the subsampled signal, and do a full decode only of the audio streams with sufficient power to warrant a full decode. For large conference sessions, this may reduce the overall decoder complexity by about a factor of ten. Similar consideration may be made for other codecs for which estimates of audio stream power can be inferred from an initial, lower complexity partial decode.

In one form, a method is provided. The method comprises: receiving, from each of a plurality of participant devices in a communication session, a respective one of a plurality of audio streams; estimating an audio energy of each of the plurality of audio streams; based on the estimated audio energy of each of the plurality of audio streams, determining whether to perform a transform on at least one of the plurality of audio streams; and if it is determined to perform the transform on the at least one of the plurality of audio streams: performing the transform on the at least one of the plurality of audio streams; and transmitting the at least one of the plurality of audio streams to at least one of the plurality of participant devices.

In another form, an apparatus is provided. The apparatus comprises: a memory; and one or more processors configured to: receive, from each of a plurality of participant devices in a communication session, a respective one of a plurality of audio streams; estimate an audio energy of each of the plurality of audio streams; based on the estimated audio energy of each of the plurality of audio streams, determine whether to perform a transform on at least one of the plurality of audio streams; and if it is determined to perform the transform on the at least one of the plurality of audio streams: perform the transform on the at least one of the plurality of audio streams; and transmit the at least one of the plurality of audio streams to at least one of the plurality of participant devices.

In another form, one or more non-transitory computer readable storage media are provided. The non-transitory computer readable storage media are encoded with instructions that, when executed by a processor, cause the processor to: obtain, from each of a plurality of participant devices in a communication session, a respective one of a plurality of audio streams; estimate an audio energy of each of the plurality of audio streams; based on the estimated audio energy of each of the plurality of audio streams, determine whether to perform a transform on at least one of the plurality of audio streams; and if it is determined to perform a transform on the at least one of the plurality of audio streams: perform the transform on the at least one of the plurality of audio streams; and transmit the at least one of the plurality of audio streams to at least one of the plurality of participant devices.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving, from each of a plurality of participant devices in a communication session, a respective one of a plurality of audio streams;
   estimating an audio energy of each of the plurality of audio streams;
   based on the estimated audio energy of each of the plurality of audio streams, determining whether to perform a transform on at least one of the plurality of audio streams, the determining including determining whether performing the transform would require a processing load that is less than a processing load threshold; and
   if it is determined to perform the transform on the at least one of the plurality of audio streams:
     performing the transform on the at least one of the plurality of audio streams; and
     transmitting the at least one of the plurality of audio streams to at least one of the plurality of participant devices.

2. The method of claim 1, wherein the audio streams are modified discrete cosine transformed frequency domain audio streams, the method further comprising:
   partially decoding the plurality of audio streams so as to determine modified discrete cosine transform frequency coefficients corresponding to each of the plurality of audio streams, wherein:
   estimating includes estimating the audio energy of each of the plurality of audio streams based on the coefficients;
   determining includes determining whether to perform an inverse modified discrete cosine transform on the at least one of the plurality of audio streams; and
   performing includes performing the inverse modified discrete cosine transform on the at least one of the plurality of audio streams.

3. The method of claim 2, wherein determining whether to perform the inverse modified discrete cosine transform on the at least one of the plurality of audio streams further includes:
   determining whether the at least one of the plurality of audio streams among the plurality of audio streams has a highest estimated audio energy.

4. The method of claim 2, wherein determining whether to perform the inverse modified discrete cosine transform on the at least one of the plurality of audio streams further includes:
   determining whether the at least one of the plurality of audio streams has an estimated audio energy that exceeds an audio energy threshold.

5. The method of claim 1, wherein:
   estimating includes estimating the audio energy of each of the plurality of audio streams in the time domain;
   determining includes determining whether to perform a modified discrete cosine transform on the at least one of the plurality of audio streams; and
   performing includes performing the modified discrete cosine transform on the at least one of the plurality of audio streams.

6. The method of claim 5, further comprising:
   if it is determined not to perform the transform on an audio stream of the plurality of audio streams, replacing the audio stream with comfort noise.

7. The method of claim 1, wherein the audio streams are modified discrete cosine transformed frequency domain audio streams, and wherein:
   performing includes performing the inverse modified discrete cosine transform on the at least one of the plurality of audio streams.

8. An apparatus comprising:
   a network interface configured to enable communications over a network in order to receive, from each of a plurality of participant devices in a communication session, a respective one of a plurality of audio streams; and
   one or more processors coupled to the network interface, wherein the one or more processors are configured to:
     estimate an audio energy of each of the plurality of audio streams;
     based on the estimated audio energy of each of the plurality of audio streams, determine whether to perform a transform on at least one of the plurality of audio streams, including determining whether performing the transform would require a processing load that is less than a processing load threshold; and
     if it is determined to perform the transform on the at least one of the plurality of audio streams:
       perform the transform on the at least one of the plurality of audio streams; and transmit the at least one of the plurality of audio streams to at least one of the plurality of participant devices.

9. The apparatus of claim 8, wherein the audio streams are modified discrete cosine transformed frequency domain audio streams, the one or more processors further configured to:
partially decode the plurality of audio streams so as to determine modified discrete cosine transform frequency coefficients corresponding to each of the plurality of audio streams, wherein the one or more processors are configured to:
estimate by estimating the audio energy of each of the plurality of audio streams based on the coefficients;
determine by determining whether to perform an inverse modified discrete cosine transform on the at least one of the plurality of audio streams; and
perform by performing the inverse modified discrete cosine transform on the at least one of the plurality of audio streams.

10. The apparatus of claim 9, wherein the one or more processors are further configured to determine whether to perform the inverse modified discrete cosine transform on the at least one of the plurality of audio streams by:
determining whether the at least one of the plurality of audio streams among the plurality of audio streams has a highest estimated audio energy.

11. The apparatus of claim 9, wherein the one or more processors are further configured to determine whether to perform the inverse modified discrete cosine transform on the at least one of the plurality of audio streams by:
determining whether the at least one of the plurality of audio streams has an estimated audio energy that exceeds an audio energy threshold.

12. The apparatus of claim 8, wherein the one or more processors are configured to:
estimate by estimating the audio energy of each of the plurality of audio streams in the time domain;
determine by determining whether to perform a modified discrete cosine transform on the at least one of the plurality of audio streams; and
perform by performing the modified discrete cosine transform on the at least one of the plurality of audio streams.

13. The apparatus of claim 12, wherein the one or more processors are further configured to:
if it is determined not to perform the transform on an audio stream of the plurality of audio streams, replace the audio stream with comfort noise.

14. The apparatus of claim 8, wherein the audio streams are modified discrete cosine transformed frequency domain audio streams, and wherein the one or more processors are configured to:
perform by performing the inverse modified discrete cosine transform on the at least one of the plurality of audio streams.

15. One or more non-transitory computer readable storage media encoded with instructions that, when executed by a processor, cause the processor to:
obtain, from each of a plurality of participant devices in a communication session, a respective one of a plurality of audio streams;
estimate an audio energy of each of the plurality of audio streams;
based on the estimated audio energy of each of the plurality of audio streams, determine whether to perform a transform on at least one of the plurality of audio streams, including determining whether performing the transform would require a processing load that is less than a processing load threshold; and
if it is determined to perform the transform on the at least one of the plurality of audio streams:
perform the transform on the at least one of the plurality of audio streams; and
transmit the at least one of the plurality of audio streams to at least one of the plurality of participant devices.

16. The non-transitory computer readable storage media of claim 15, wherein the audio streams are modified discrete cosine transformed frequency domain audio streams, the instructions further causing the processor to:
partially decode the plurality of audio streams so as to determine modified discrete cosine transform frequency coefficients corresponding to each of the plurality of audio streams, wherein the instructions cause the processor to:
estimate by estimating the audio energy of each of the plurality of audio streams based on the coefficients;
determine by determining whether to perform an inverse modified discrete cosine transform on the at least one of the plurality of audio streams; and
perform by performing the inverse modified discrete cosine transform on the at least one of the plurality of audio streams.

17. The non-transitory computer readable storage media of claim 16, wherein the instructions that cause the processor to determine whether to perform the inverse modified discrete cosine transform on the at least one of the plurality of audio streams cause the processor to:
determine whether the at least one of the plurality of audio streams among the plurality of audio streams has a highest estimated audio energy.

18. The non-transitory computer readable storage media of claim 16, wherein the instructions that cause the processor to determine whether to perform the inverse modified discrete cosine transform on the at least one of the plurality of audio streams cause the processor to:
determine whether the at least one of the plurality of audio streams has an estimated audio energy that exceeds an audio energy threshold.

19. The non-transitory computer readable storage media of claim 15, the instructions further causing the processor to:
estimate by estimating the audio energy of each of the plurality of audio streams in the time domain;
determine by determining whether to perform a modified discrete cosine transform on the at least one of the plurality of audio streams; and
perform by performing the modified discrete cosine transform on the at least one of the plurality of audio streams.

20. The non-transitory computer readable storage media of claim 15, wherein the audio streams are modified discrete cosine transformed frequency domain audio streams, and wherein the instructions cause the processor to:
perform by performing the inverse modified discrete cosine transform on the at least one of the plurality of audio streams.

* * * * *